(12) United States Patent
Aoyama et al.

(10) Patent No.: US 7,844,698 B2
(45) Date of Patent: Nov. 30, 2010

(54) WIRELESS NETWORK MODIFICATION SUPPORT SYSTEM AND RADIO NETWORK MODIFICATION SUPPORT METHOD

(75) Inventors: Akio Aoyama, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1209 days.

(21) Appl. No.: 10/547,079

(22) PCT Filed: Jun. 10, 2004

(86) PCT No.: PCT/JP2004/008137

§ 371 (c)(1),
(2), (4) Date: Aug. 26, 2005

(87) PCT Pub. No.: WO2004/112414

PCT Pub. Date: Dec. 23, 2004

(65) Prior Publication Data

US 2006/0083366 A1    Apr. 20, 2006

(30) Foreign Application Priority Data

Jun. 16, 2003   (JP) .............................. 2003-170845

(51) Int. Cl.
  G06F 15/173   (2006.01)
  G06F 17/00    (2006.01)
  H04W 40/00    (2009.01)
  H04M 1/00     (2006.01)
  G06G 7/00     (2006.01)

(52) U.S. Cl. .................... 709/224; 455/446; 455/562.1; 705/400

(58) Field of Classification Search ................. 709/224; 455/446, 562.1; 705/400
See application file for complete search history.

(56) References Cited

U.S. PATENT DOCUMENTS 5,710,758 A * 1/1998 Soliman et al. ............. 370/241
5,987,328 A * 11/1999 Ephremides et al. ........ 455/446

(Continued)

FOREIGN PATENT DOCUMENTS

EP    1 091 544 A2    4/2001

(Continued)

*Primary Examiner*—George C Neurauter, Jr.
(74) *Attorney, Agent, or Firm*—Sughrue Mion, PLLC

(57) ABSTRACT

A wireless network change support system includes a change setting section, an income prediction section and an expense calculation section. The change setting section sets a change data for changing a setting data based on a status data indicating a status of a wireless network with wireless base stations and said setting data indicating a setting of said wireless network. The income prediction section calculates a prediction income in said wireless network when said setting data is changed, based on said status data, said setting data and said change data. The expense calculation section calculates a prediction expense necessary to execute a change of said wireless network as indicated in said change data based on said change data. The wireless network change support system may further includes an income and expenditure calculation section which calculates a profit of said wireless network when said setting data is changed on the basis of said changing data, based on said prediction income and said prediction expense.

30 Claims, 11 Drawing Sheets

U.S. PATENT DOCUMENTS

| | | | |
|---|---|---|---|
| 6,094,580 A * | 7/2000 | Yu et al. | 455/446 |
| 6,111,857 A * | 8/2000 | Soliman et al. | 370/254 |
| 6,298,328 B1 * | 10/2001 | Healy et al. | 705/10 |
| 6,393,290 B1 * | 5/2002 | Ufongene | 455/446 |
| 6,418,327 B1 * | 7/2002 | Carey et al. | 455/562.1 |
| 6,628,622 B1 * | 9/2003 | Bulick et al. | 370/254 |
| 6,813,497 B2 * | 11/2004 | Hutcheson et al. | 455/453 |
| 6,917,816 B2 * | 7/2005 | Abed et al. | 455/556.1 |
| 7,184,770 B1 * | 2/2007 | Narasimhan et al. | 455/446 |
| 7,243,054 B2 * | 7/2007 | Rappaport et al. | 703/2 |
| 2001/0051503 A1 * | 12/2001 | Lush | 455/2.01 |

FOREIGN PATENT DOCUMENTS

| | | |
|---|---|---|
| JP | 6-188817 A | 7/1994 |
| JP | 7-283778 A | 10/1995 |
| JP | 8-317458 A | 11/1996 |
| JP | 8-322079 A | 12/1996 |
| JP | 2001-285923 A | 10/2001 |
| JP | 2002-261818 A | 9/2002 |
| JP | 2003-8498 A | 1/2003 |
| JP | 2003-101537 A | 4/2003 |
| WO | WO 93/15591 A1 | 8/1993 |
| WO | WO 97/36255 A1 | 10/1997 |

* cited by examiner

Fig. 1 Prior Art
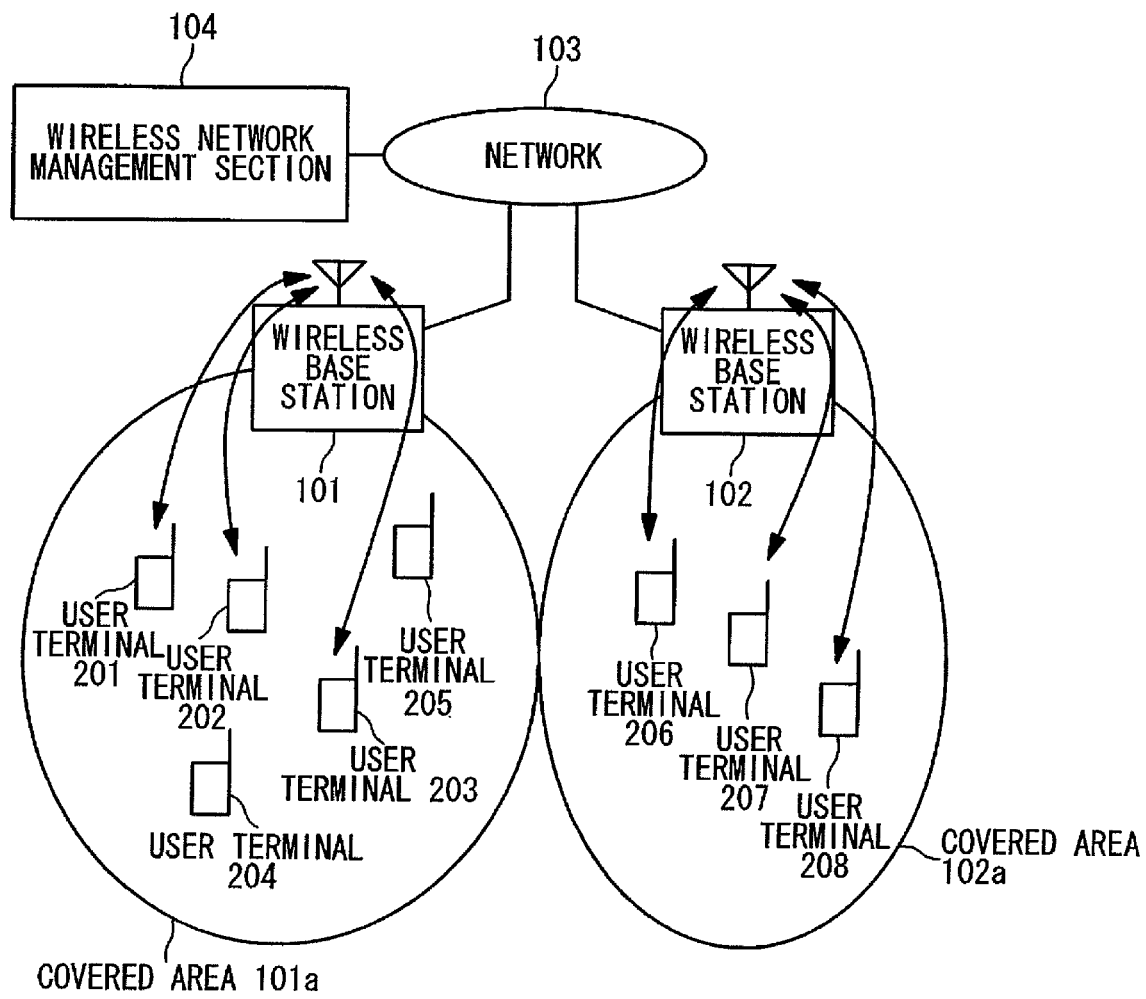
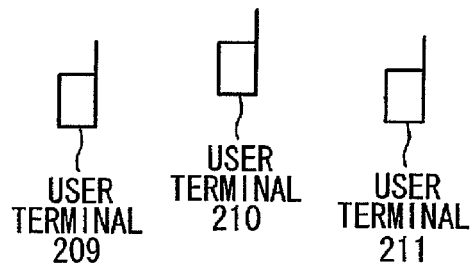

Fig. 3  Prior Art
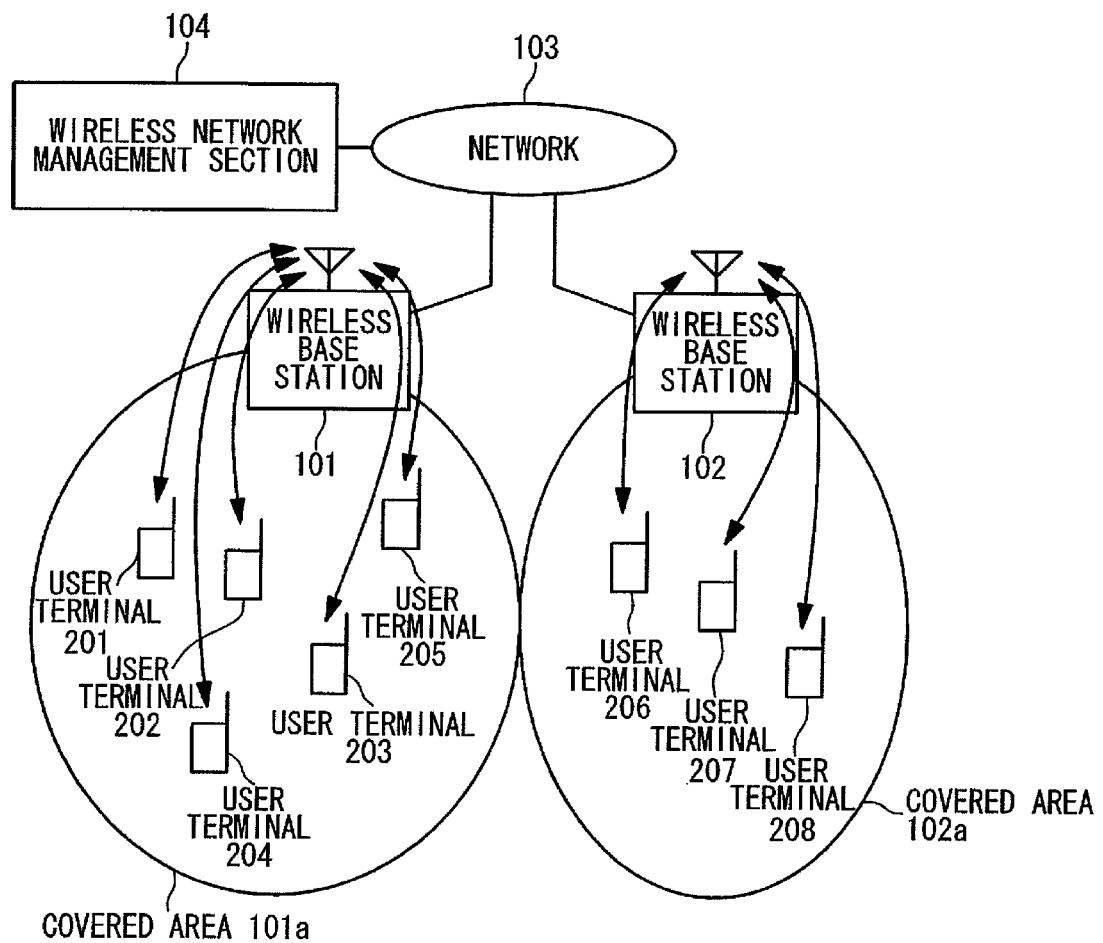
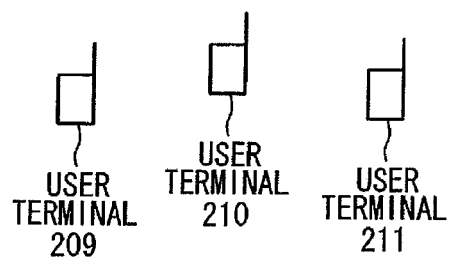

LIST OF METHOD FOR OPTIMIZING PROFIT MARGIN

| PROFIT MARGIN ORDER | PROFIT MARGIN [PROFIT/ EXPENSE] [%] | PROFIT [¥/YEAR] | INCOME [¥/YEAR] | INCREASE INCOME [¥/YEAR] | EXPENSE [¥/YEAR] | INCREASE EXPENSE [¥/YEAR] | CHANGE OF WIRELESS PARAMETER OF EXTENSION POINT OF |
|---|---|---|---|---|---|---|---|
| PRESENT | 200% | 60M | 90M | - | 30M | - | - |
| 1 | 257% | 77M | 110M | 20M | 33M | 3M | FILE 1 |
| 2 | 215% | 71M | 107M | 17M | 34M | 4M | FILE 2 |
| 3 | 209% | 67M | 99M | 9M | 32M | 2M | FILE 3 |
| .. | | | | | | | .. |

↑ OPTIMAL

WIRELESS NETWORK MODIFICATION SUPPORT SYSTEM AND RADIO NETWORK MODIFICATION SUPPORT METHOD

TECHNICAL FIELD

The present invention relates to a wireless network change support system and a method for supporting wireless network change. More particularly, the present invention relates to the wireless network change support system and the method for supporting wireless network change, which propose a more appropriate wireless network.

BACKGROUND ART

An extension of covered areas in a wireless network or an increase of a bandwidth of the wireless network are occasionally achieved by an "extension of the wireless base station" or a "change of the wireless parameter" in the wireless base stations even after starting an operation of the wireless network, which includes a plurality of wireless base stations to executes a wireless communication between users.

FIG. 1 is a block diagram showing a configuration of the conventional wireless network. The wireless network shown in FIG. 1 includes a wireless base station 101, a wireless base station 102, a network 103, and a wireless network management section 104. The wireless network management section 104 is managed by a wireless network service provider. The wireless base station 101 and the wireless base station 102 are managed by the wireless network management section 104 through the network 103. A covered area and a bandwidth are set as wireless parameters in each of the wireless base station 101 and the wireless base station 102. The covered areas as a wireless network are areas to be covered by each wireless base station included in the wireless network. Here, the wireless base station 101 has a covered area 101a with the bandwidth that can accommodate three user terminals. Moreover, the wireless base station 102 has a covered area 102a with the bandwidth that can accommodate three user terminals.

In FIG. 1, user terminals 201, 202 and 203 in the wireless network exist in the covered area 101a. The wireless base station 101 accommodates the user terminals 201, 202 and 203. User terminals 206, 207 and 208 exist in the covered area 102a. The wireless base station 102 accommodates the user terminals 206, 207 and 208. Each user terminal is exemplified by a mobile terminal such as a cellular phone and a PDA (Personal Digital Assistant), and a personal computer of note type. The user terminals 204 and 205 exist in the covered area 101a covered by the wireless base station 101, they, however, are not accommodated by the wireless base station 101 since the bandwidth of the wireless base station 101 has no capacity. User terminals 209, 210 and 211 never be accommodated in the wireless network, since they are not included in neither the covered area 101a of the wireless base station 101 nor covered area 102a of the wireless base station 102.

FIG. 2 is a block diagram showing another configuration of conventional wireless network. FIG. 2 shows an example where a wireless base station 105 is added on the configuration shown in FIG. 1 in order to extend the covered area in the wireless network. In FIG. 2, the same code is referred to the same item as the one in the configuration in FIG. 1. In FIG. 2, the added wireless base station 105 has covered areas 105a, and has a bandwidth enough to accommodate three user terminals. User terminals 209, 210 and 211 are to be accommodated in the wireless network because of the extension of the covered area by adding the wireless base station 105.

FIG. 3 is a block diagram showing further another configuration of a conventional wireless network. FIG. 3 shows an example where a bandwidth of the wireless base station 101 is increased by changing the wireless parameter of the wireless base station 101 in FIG. 1. In FIG. 3, the same code is referred to the same item as the one in the configuration shown in FIG. 1. In FIG. 3, the wireless base station 101 has the bandwidth enough to accommodate five user terminals by changing the wireless parameter. As a result, the user terminals 204 and 205, which are not accommodated by the wireless base station 101 in the configuration shown in FIG. 1, are accommodated by the wireless base station 101.

FIG. 4 is a block diagram showing further another configuration of a conventional wireless network. FIG. 4 shows an example where the wireless parameter of the wireless base station 101 shown in FIG. 1 is changed to extend the covered area 101a of the wireless base station 101 and to increase the bandwidth of the wireless base station 101. In FIG. 4, the same code is referred to the same item as the one in the configuration shown in FIG. 1. In FIG. 4, the covered area 101a of the wireless base station 101 is extended and the wireless base station 101 achieved to have enough bandwidth to accommodate seven user terminals by changing the wireless parameter. As a result, it is possible to further accommodate the user terminals 204, 205, 209 and 210.

In a conventional technique, when executing the "extension of the wireless base station" or the change of the wireless parameter of the wireless base station as shown in FIGS. 2, 3 and 4, a simulator is used, so that the extension of the covered area of the wireless network or the increase of the bandwidth of the wireless network are calculated, and proposals regarding the "extension of the wireless base station" or the change of the wireless parameter of the wireless base station are made based on the calculation result. Then, the proposals are provided to the wireless network service providers.

Incidentally, the wireless network service providers take income by charging a use fee based on the traffic load of the users who are accommodated in the wireless network. On the other hand, an operation cost of the wireless network is expenditure. The difference of the income and the expenditure is the profit of the wireless network service provider.

In conjunction with the above description, Japanese Laid Open Patent Applications JP H08-317458A and JP 2001-285923A discloses a technique by which the wireless network service providers decides an arrangement pattern of wireless base stations in consideration of there own profits.

Japanese Laid Open Patent Application JP H08-317458A discloses a method for deciding the arrangement pattern of a PHS base station. In the method of deciding the arrangement pattern of the PHS base station, first, a plurality of various arrangement pattern of the PHS base stations is prepared for a predetermined service planning area. Next, a simulation of an electric field strength distribution is carried out on each of the arrangement patterns. Continuously, the ratio of the dimension of a call-possible area to the dimension of the service planning area is calculated as a quality assessment value in every arrangement pattern based on the simulation result. Afterwards, a cost evaluation value is calculated in every arrangement pattern. Then an arrangement pattern for the service planning area is decided from all arrangement patterns based on the quality assessment value and the cost evaluation value for each arrangement pattern.

Japanese Laid Open Patent Application JP 2001-285923A discloses a method for deciding a base station arrangement pattern. In the method for deciding a base station arrangement pattern, first, a map of a target area, which includes data of shape of buildings that influences transmission of an electric wave, is prepared for the base station arrangement. Next, places, in which the base stations can be arranged, are detected from the prepared map. Then, each of the places is specified as a base station candidate point where the base station will be arranged. Further, area evaluation points, which are given discretely as evaluation positions of reception ability, is specified in order to specify a communication possible area in the target area for the arrangement of the base station. Afterwards, electric power, which is received at each of the area evaluation points, is calculated in the case that the base station would be arranged at one of the base station candidate points, for every base station candidate point. Based on this result, the communication possible area is specified in the case that the base station would be arranged at one of the base station candidate points. However, the communication possible area is given as a collection of the area evaluation points that are judged as communication possible positions in which the received electrical power is larger than the predetermined threshold. Afterwards, a gene information expression form is selected, which corresponds to a combination of the base station candidate points to arrange the base station. An evaluation function corresponding to the purpose for the base station arrangement is set with that. A genetic algorithm is applied to search the gene information that maximizes the adaptation given by the evaluation function, then, an optimal base station arrangement pattern is decided.

These techniques provide an arrangement pattern of the wireless base station and an arrangement cost as data to decide an arrangement pattern of the wireless base stations. The arrangement pattern is decided based on a simulation. The arrangement cost is a cost needed to achieve the arrangement pattern. However, only the information concerning the expense of the wireless network service provider is provided as information concerning the profit of the wireless network service provider.

The profit of the wireless network service provider is obtained by subtracting the expense from the income. Therefore, if there is no information concerning the income when the wireless network is changed, it is difficult for the wireless network service provider to decide the change in the wireless network taking consideration in their own profit. That is, these techniques have a difficulty to provide a change proposal for the wireless network to improve the profit margin of the wireless network that is an end goal of the wireless network service provider.

In conjunction with the above description, Japanese Laid Open Patent Application JP H08-322079A discloses a method for deciding an arrangement position of an extensional base station in PHS. The method for deciding an arrangement position of an extensional base station in PHS decides the arrangement position of the extensional base station to extend the PHS base station in a service area in which one or a plurality of PHS base station is arranged. First, the electric field strengths are measured in the plurality of points in the above-mentioned service area. Next, parameters of a mathematical model is adjusted so that the electric field strength distribution in the above-mentioned service area, which is calculated by a simulation using the above mentioned mathematical model, matches the electric field strength distribution by the measurement result of the above-mentioned electric field strength as much as possible. Continuously, parameters concerning an extensional base station including the parameters concerning arrangement positions for the extensional base station are given to the mathematical model after the parameters are adjusted in order to simulate the electric field strength distribution in the above-mentioned service area when assuming that the extensional base station is arranged. Afterwards, the simulation result is evaluated. The parameters concerning the extensional base station are changed after repeating the above-mentioned each process, parameters concerning a suitable extensional base station are decided based on the evaluation results of each parameter concerning the extensional base station.

Japanese Laid Open Patent Application JP H06-188817A discloses a method for arranging wireless base stations. In the method for arranging a base station, each wireless base station is arranged in which intervals of micro cell base stations are in inverse proportion to bias of the traffic load so that the traffic load covered by each cell becomes approximately equal. The method tries to make a communication quality of a reverse link be constant in a code division multiple access mobile communication system.

Japanese Laid Open Patent Application JP 2003-8498A discloses service area examination system. The service area examination system executes a measuring of service area, an optimization, and a managing of a newly extended base station. The service area examination system includes an area measuring apparatus, a mobile communication system, a network, and a server. The area measuring apparatus calculates the service area based on a simulation result, and moves in the service area to execute various measurements and optimization of the base station. The data processing base station communicates with the area measuring apparatus for data processing. The mobile communication system includes the newly extended base stations and a plurality of control bureau to control the newly extended base stations. The network is connected with the mobile communication system. The server is connected with the network to analyze measurement data transmitted from the area measuring apparatus, then, provides the processing result to the area measurement apparatus. The area measurement apparatus adjusts a parameter and an antenna tilt of the newly extended base station based on the processing result from the server by a remote control.

Recently, the charge for use of the wireless network has been decreasing in recent years. Therefore, it is very important for the wireless network service provider to suppress an investment and operation cost of the wireless network and increase a profit margin, satisfying demands of the users of the wireless network and the communication quality. It is desired to propose the "extension of the wireless base station" and the change of the wireless parameter of the wireless base station by which the profit margin of the wireless network is maximized.

DISCLOSURE OF INVENTION

Therefore, an object of the present invention is to provide a wireless network change support system and a method for supporting wireless network change which can propose more appropriate wireless network than before.

Another object of the present invention is to provide a wireless network change support system and a method for supporting wireless network change which can propose the change of the wireless network to increase the profit margin of the wireless network.

This and other objects, features and advantages of the present invention will be readily ascertained by referring to the following description and drawings.

In order to achieve an aspect of the present invention, the present invention provides a wireless network change support system including a change setting section, an income prediction section and an expense calculation section. The change setting section sets a change data for changing a setting data based on a status data indicating a status of a wireless network with wireless base stations and the setting data indicating a setting of the wireless network. The income prediction section calculates a prediction income in the wireless network when the setting data is changed, based on the status data, the setting data and the change data. The expense calculation section calculates a prediction expense necessary to execute a change of the wireless network as indicated in the change data based on the change data.

The wireless network change support system further includes an income and expenditure calculation section which calculates a profit of the wireless network when the setting data is changed on the basis of the changing data, based on the prediction income and the prediction expense.

In the wireless network change support system, the income prediction section includes a traffic prediction section and an income calculation section. The traffic prediction section calculates a prediction traffic data indicating a predict traffic load in the wireless network when the setting data is changed on the basis of the changing data, based on the status data, the setting data and the change data. The income calculation section calculates the prediction income based on the prediction traffic data.

In the wireless network change support system, the change setting section includes a base station extension section which sets an extension position data indicating a extension position for a wireless base station extended in the wireless network based on the status data and the setting data. The change data includes the extension position data.

The wireless network change support system further includes a first storage section which stores the setting data and a second storage section which stores the status data. The setting data includes a covered area data indicating a covered area of a sector of each of the wireless base stations included in the wireless network before the wireless base station is extended. The status data includes a traffic data indicating a status of traffic of a sector of each of the wireless base stations included in the wireless network before the wireless base station is extended. The base station extension section includes: an extension point search section which searches the extension position based on the covered area data stored in the first storage section and the traffic data stored in the second storage section. The base station extension section sets the extension position data based on a searching result of the extension point search section.

In the wireless network change support system, the extension point search section searches at least one of an area occupying a large area and surrounded by sectors having a large traffic load from areas except for the covered area and a sector having a large traffic load which cannot be accommodated among sectors of each of the wireless base stations, as the extension position.

In the wireless network change support system, the setting data includes a wireless parameter indicating communication properties of the wireless network. The change setting section includes a wireless parameter change section which sets a wireless parameter change data indicating a change of the wireless parameter based on the status data and the setting data. The change data includes the wireless parameter change data.

In the wireless network change support system, the setting data includes a wireless parameter indicating communication properties of the wireless network. The change setting section includes a wireless parameter change section which sets a wireless parameter change data indicating a change of the wireless parameter based on the status data and the setting data.

The wireless network change support system further includes a third storage section which stores the setting data and a fourth storage section which stores the status data. The setting data includes a covered area data indicating a covered area of a sector of each of the wireless base stations included in the wireless network before the wireless parameter is changed. The status data includes a traffic data indicating a status of traffic of a sector of each of the wireless base stations included in the wireless network before the wireless parameter is changed. The wireless parameter change section includes an change target search section which searches a wireless base station of which the wireless parameter to be changed based on the covered area data stored in the third storage section and the traffic data stored in the fourth storage section. The wireless parameter change section sets a wireless base station of which the wireless parameter to be changed based on a searching result of the change target search section.

The wireless network change support system further includes a third storage section which stores the setting data and a fourth storage section which stores the status data. The setting data includes a covered area data indicating a covered area of a sector of each of the wireless base stations included in the wireless network before the wireless parameter is changed. The status data includes a traffic data indicating a status of traffic of a sector of each of the wireless base stations included in the wireless network before the wireless parameter is changed. The wireless parameter change section includes an change target search section which searches a wireless base station of which the wireless parameter to be changed based on the covered area data stored in the third storage section and the traffic data stored in the fourth storage section. The wireless parameter change section sets a wireless base station of which the wireless parameter to be changed based on a searching result of the change target search section. The change target search section searches at least one of a wireless base station which is placed around an area occupying a large area and surrounded by sectors having a large traffic load from areas except for the covered area, a wireless base station which has a sector having a large traffic load which cannot be accommodated among sectors of each of the wireless base stations, and a wireless base station which is placed at an extension position indicated in the extension position data, as the wireless base station of which the wireless parameter to be changed.

In order to achieve another aspect of the present invention, the present invention provides a method for supporting wireless network change, which executes a change of a wireless network with wireless base stations by using wireless a network change support system. The method includes (a) setting a change data for changing a setting data based on a status data indicating a status of the wireless network and the setting data indicating a setting of the wireless network by a change setting section of the network change support system; (b) calculating a prediction income in the wireless network when the setting data is changed, based on the status data, the setting data and the change data by an income prediction section of the network change support system; and (c) calculating a prediction expense necessary to execute a change of the wireless network as indicated in the change data based on the change data by an expense calculation section of the network change support system.

The method for supporting wireless network change further includes (d) calculating a profit of the wireless network when the setting data is changed on the basis of the changing data, based on the prediction income and the prediction expense by an income and expenditure calculation section of the network change support system.

In the method for supporting wireless network change, the step (b) includes (b1) calculating a prediction traffic data indicating a predict traffic load in the wireless network when the setting data is changed on the basis of the changing data, based on the status data, the setting data and the change data by the income prediction section and (b2) calculating the prediction income based on the prediction traffic data by the income prediction section.

In the method for supporting wireless network change, the step (a) includes (a1) setting an extension position data indicating a extension position for a wireless base station extended in the wireless network based on the status data and the setting data by the change setting section. The change data includes the extension position data.

In the method for supporting wireless network change, the step (a1) includes (a11) searching the extension position based on the setting data and the status data by the change setting section and (a12) setting the extension position data based on the searching result by the change setting section. The setting data includes a covered area data indicating a covered area of a sector of each of the wireless base stations included in the wireless network before the wireless base station is extended. The status data includes a traffic data indicating a status of traffic of a sector of each of the wireless base stations included in the wireless network before the wireless base station is extended.

In the method for supporting wireless network change, the step (a11) includes (a111) searching at least one of an area occupying a large area and surrounded by sectors having a large traffic load from areas except for the covered area and a sector having a large traffic load which cannot be accommodated among sectors of each of the wireless base stations, as the extension position by the change setting section.

In the method for supporting wireless network change, the setting data includes a wireless parameter indicating communication properties of the wireless network. The step (a) further includes (a2) setting a wireless parameter change data indicating a change of the wireless parameter based on the status data and the setting data by change setting section. The change data includes the wireless parameter change data.

In the method for supporting wireless network change, the setting data includes a wireless parameter indicating communication properties of the wireless network. The step (a) includes (a2) setting a wireless parameter change data indicating a change of the wireless parameter based on the status data and the setting data by the change setting section. The change data includes the wireless parameter change data.

In the method for supporting wireless network change, the step (a2) includes (a21) searching a wireless base station of which the wireless parameter to be changed based on the setting data and the status data by the change setting section, and (a22) setting a wireless base station of which the wireless parameter to be changed based on a searching result of the change target search section (11b1) by the change setting section. The setting data includes a covered area data indicating a covered area of a sector of each of the wireless base stations included in the wireless network before the wireless parameter is changed. The status data includes a traffic data indicating a status of traffic of a sector of each of the wireless base stations included in the wireless network before the wireless parameter is changed.

In the method for supporting wireless network change, the step (a2) includes (a21) searching a wireless base station of which the wireless parameter to be changed based on the setting data and the status data by the change setting section, and (a22) setting a wireless base station of which the wireless parameter to be changed based on a searching result of the change target search section (11b1) by the change setting section. The setting data includes a covered area data indicating a covered area of a sector of each of the wireless base stations included in the wireless network before the wireless parameter is changed. The status data includes a traffic data indicating a status of traffic of a sector of each of the wireless base stations included in the wireless network before the wireless parameter is changed. The step (a21) includes (a211) searching at least one of a wireless base station which is placed around an area occupying a large area and surrounded by sectors having a large traffic load from areas except for the covered area, a wireless base station which has a sector having a large traffic load which cannot be accommodated among sectors of each of the wireless base stations, and a wireless base station which is placed at an extension position indicated in the extension position data, as the wireless base station of which the wireless parameter to be changed by the change setting section.

In order to achieve another aspect of the present invention, the present invention provides a computer program product with program code means for carrying out all steps of a method for supporting wireless network change according to any one of above-mentioned methods if the program runs on a computer.

In order to achieve another aspect of the present invention, the present invention provides a computer program product with program code means according to above-mentioned computer program product which are stored on a storage means which can be read by the computer.

BRIEF DESCRIPTION OF THE DRAWINGS

FIG. 1 is a block diagram showing a configuration of the conventional wireless network;

FIG. 3 is a block diagram showing further another configuration of a conventional wireless network;

FIG. 11 is an example of a display of the display panel 16.

BEST MODE FOR CARRYING OUT THE INVENTION

Embodiments of a wireless network change support system and a method for supporting wireless network change according to the present invention will be described below with reference to the attached drawings.

Figure 2:
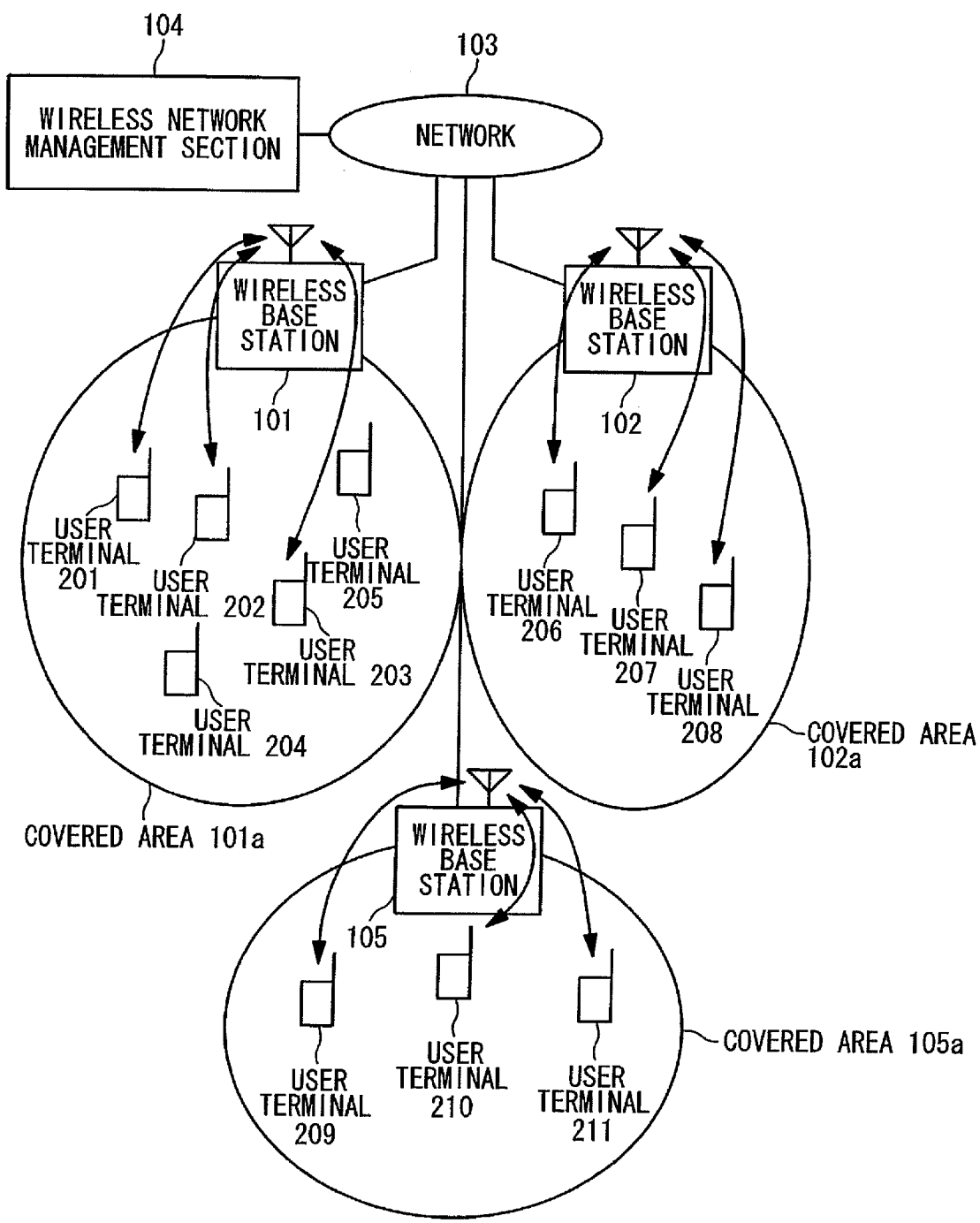
FIG. 2 is a block diagram showing another configuration of conventional wireless network.
Figure 4:
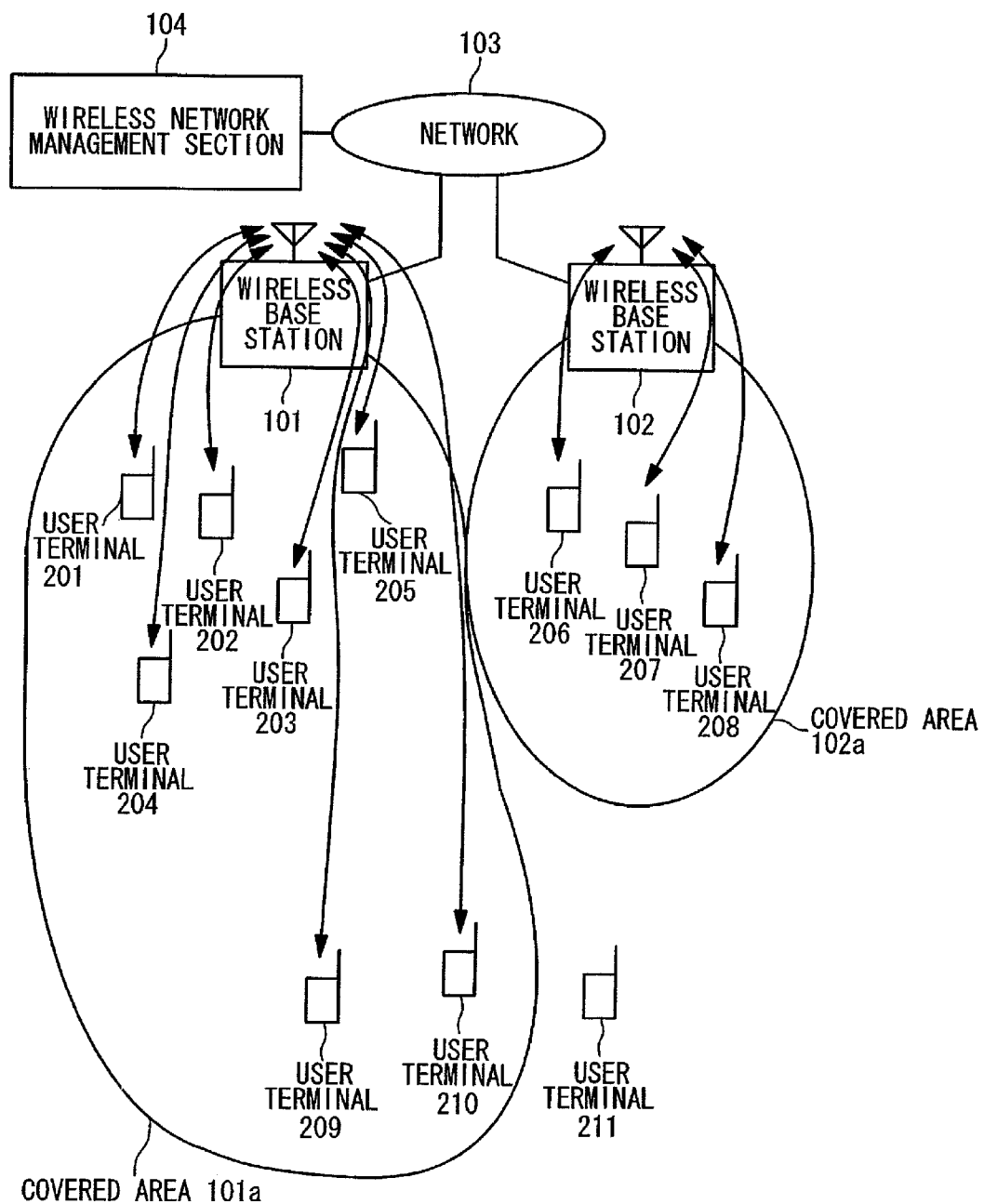
FIG. 4 is a block diagram showing further another configuration of a conventional wireless network.
Figure 5:
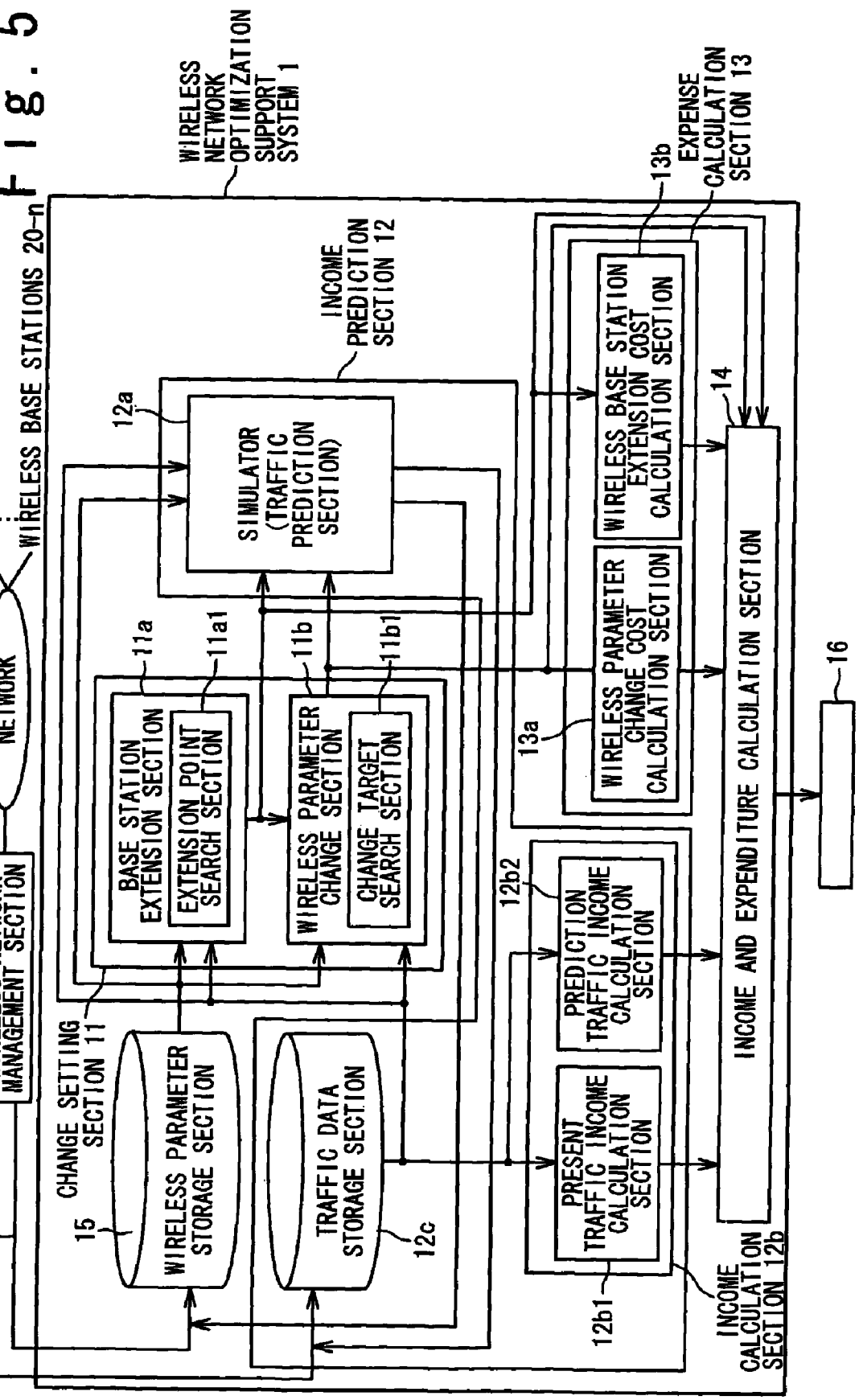
FIG. 5 is a block diagram showing a the configuration of the wireless network change support system in the embodiment of the present invention.

First, as the wireless network change support system in the embodiment of the present invention, a configuration of a wireless network optimization support system is explained. FIG. 5 is a block diagram showing a the configuration of the wireless network optimization support system as the wireless network change support system in the embodiment of the present invention. The wireless network optimization support system in the embodiment of the present invention can provide a change proposal to improve profits of the existing wireless network and achieve the efficiency of the wireless network.

In FIG. 5, a wireless network optimization support system 1 includes a change setting section 11, an income prediction section 12, an expense calculation section 13, an income and expenditure calculation section 14, and a wireless parameter storage section 15 as a first storage section and a third storage section.

The wireless network optimization support system 1 is a data processor exemplified by a workstation. In this case, the change setting section 11, the income prediction section 12, the expense calculation section 13, and the income and expenditure calculation section 14 are programs, and the wireless parameter storage section 15 is a program and data.

Each of the change setting section 11, the income prediction section 12, the expense calculation section 13, and the income and expenditure calculation section 14 may be a data processor exemplified by a workstation and a personal computer, and the wireless parameter storage section 15 may be a database. In this case, the wireless network optimization support system 1 is a combination system a plurality of data processors and a database.

The wireless network optimization support system 1 is connected with a wireless network management section 4 in a wireless network. The wireless network includes wireless base stations 20-1 to 20-n (n is a natural number), the network 3, and the wireless network management section 4. The wireless network management section 4 is managed by a wireless network manager. The wireless base stations 20-1 to 20-n are managed by the wireless network management section 4 through network 3. The wireless base stations 20-1 to 20-n execute wireless communications with user terminals. A covered area and a bandwidth as a wireless parameter are set in each of the wireless base stations 20-1 to 20-n. The covered area is an area to be covered by each wireless base station 20 included in the wireless network. The wireless network management section 4, the network 3, and the wireless base stations 20-1 to 20-n are similar to the wireless network management section 104, the network 103, and the wireless base stations 101, 102 in the conventional technique, then the explanations are omitted.

The change setting section 11 sets a change data that shows a change in the wireless network. The change setting section 11 includes a base station extension section 11a and a wireless parameter change section 11b. The base station extension section 11a has an extension point search section 11a1. The wireless parameter change section 11b has a change target search section 11b1.

The income prediction section 12 calculates a prediction income in the wireless network where the change, which is shown in the change data set by the change setting section 11, is reflected. The income prediction section 12 includes a simulator 12a as a traffic prediction section, an income calculation section 12b, and a traffic data storage section 12c as a second storage section and a fourth storage section. The income calculation section 12b has a present traffic income calculation section 12b1 and a prediction traffic income calculation section 12b2.

The expense calculation section 13 calculates an expense needed to reflect the change, which is shown in the change data set by the change setting section 11, to the wireless network. The expense calculation section 13 has a wireless parameter change cost calculation section 13a and a wireless base station extension cost calculation section 13b.

The income and expenditure calculation section 14 calculates a profit after the change of the wireless network based on the prediction income calculated by the income prediction section 12 and the expense calculated by the expense calculation section 13.

The wireless parameter storage section 15 stores the inputted wireless parameter 31 in the wireless network. The wireless parameter storage section 15 supplies the stored wireless parameter in the wireless network to the base station extension section 11a, the wireless parameter change section 11b, and the simulator 12a. The wireless parameter is a data by which the performance of the wireless network can be decided.

The wireless parameter (a setting data) includes a data showing an installation point for the wireless base station and a data of various parameters, for example. The data showing an installation point for the wireless base station indicates, for instance, height, latitude and longitude.

The various parameters are, for example, a parameter that shows tilt angle of an antenna of each wireless base station, a parameter that shows a transmission electric power of each wireless base station, a parameter of a hand over threshold of each wireless base station, a covered area data that shows a covered area of each sector of each base station decided by the wireless parameter, and the like.

The traffic data storage section 12c stores the traffic data 32 (a state data) that shows a state of the traffic of the wireless network. The traffic data indicates a using state of the user accommodated by the wireless network. The traffic data includes the traffic load of the sector of each wireless base station in the wireless network, the channel utilization, and a call blocking rate.

Concretely, the traffic data storage section 12c stores a traffic data showing the state of the traffic being accommodated at the present time, which can be obtained after a service-in of the wireless network. Moreover, the traffic data storage section 12c stores a prediction traffic data provided from the simulator 12a.

The traffic data storage section 12c supplies the present traffic data to the base station extension section 11a, the wireless parameter change section 11b, the simulator 12a, and the present traffic income calculation section 12b1. Further, the traffic data storage section 12c supplies the prediction traffic data supplied from the simulator 12a to the prediction traffic income calculation section 12b2.

The base station extension section 11a sets an extension position data as a change data, which shows an extension position for the wireless base station in the wireless network. Concretely, the base station extension section 11a sets a extension point for the wireless base station to itself (the base station extension section 11a) based on inputs of the wireless parameter of the present wireless network stored in the wireless parameter storage section 15, and the present traffic data stored in the traffic data storage section 12c. Then, the base station extension section 11a outputs the set data of the extension point in the wireless base station as the change data.

Here, the base station extension section 11a may set the extension point on the basis of an input of the extension point of the wireless base station that is decided by a person based on the wireless parameter of the present wireless network and the present traffic data. The base station extension section 11a may also set the extension point as the change data, which is searched by the extension point search section 11a1.

The base station extension section 11a supplies the data of the extension point for the wireless base station to the wireless parameter change section 11b, the simulator 12a, the wireless base station extension cost calculation section 13b, and the income and expenditure calculation section 14.

The extension point search section 11a1 searches the extension point for the wireless base station based on the wireless parameter of the present wireless network stored in the wireless parameter storage section 15, and the present traffic data stored in the traffic data storage section 12c. A method for searching the extension point will be explained later. The extension point search section 11a1 assigns a point that is included in a predetermined area in the searched area as the extension point of the wireless base station.

The point included in the predetermined area may be decided according to a judgment by a person, or the base station extension section 11a. When a person selects the point included in the predetermined area, the extension point search section 11a1, for instance, may instruct a display panel 16 to display the searched area so that the person can select the point included in the predetermined area from the display. The decided point included in the predetermined area is set in the base station extension section 11a.

The wireless parameter change section 11b changes the wireless parameter of the wireless base station to a predetermined value, based on the inputs of the present wireless parameter stored in the wireless parameter storage section 15, the present traffic data stored in the traffic data storage section 12c, and the data of the extension point for the wireless base station outputted from the base station extension section 11. Afterward, the wireless parameter change section 11b outputs a data of the changed wireless parameter as the change data.

The mentioned predetermined value may be decided by a judgment of a person based on the present wireless parameter, the present traffic data, and the data of the extension point for the wireless base station outputted from the base station extension section 11a.

Further, the mentioned predetermined value may be decided by a judgment of a person targeting the base station as wireless parameter change target that is searched by the change target search section 11b1 that is explained bellow. Furthermore, the mentioned predetermined value may be also decided by the wireless parameter change section 11b targeting the base station as wireless parameter change target.

The wireless parameter change section 11b supplies the changed wireless parameter to the simulator 12a, the wireless parameter change cost calculation section 13a, and the income and expenditure calculation section 14.

The change target search section 11b1 searches a wireless base station of which wireless parameter is to be changed based on the present wireless parameter, the present traffic data and the output of the base station extension section 11a. The search method is explained later. The change target search section 11b1 sets any one of sectors of the searched wireless base station as the base station as wireless parameter change target, that is, it sets any one of the sectors as a change data.

The simulator 12a simulates an operation of the wireless network based on inputs of the wireless parameter of the wireless network stored in the wireless parameter storage section 15, the traffic data stored in the traffic data storage section 12c, the extension point for the wireless base station outputted from the base station extension section 11a, and the changed wireless parameter outputted from the wireless parameter change section 11b.

The simulator 12a calculates not only the covered area and the bandwidth in the wireless network but also a prediction traffic data that is configured by the prediction traffic load, the prediction channel utilization, and the prediction call blocking rate in the wireless network where the change is reflected according to the change data set by the change setting section 11. Then, the simulator 12a outputs the calculated prediction traffic data to the traffic data storage section 12c.

Here is an example of the calculation of the prediction traffic load by the simulator 12a. That is, when the change data indicates the change to extend a covered area in the wireless network, the traffic load of the covered area to be extended is assumed to be an average of the existing traffic load in surrounding areas of the covered area to be extended at the calculation. When the change data indicates the change to increase a bandwidth of the wireless base station, the traffic load increasing based on an increasing bandwidth is assumed to be a value that can be obtained by multiplying the increasing bandwidth and a predetermined value.

Moreover, the simulator 12a outputs the wireless parameter of the wireless network used for the simulation (including the covered area data of the wireless network decided by the wireless parameter) to the wireless parameter storage section 15.

The present traffic income calculation section 12b1 calculates the income obtained according to the present traffic load shown in the present traffic data based on inputs of the present traffic data from the traffic data storage section 12c, and outputs the calculation result to the income and expenditure calculation section 14. For instance, the present traffic income calculation section 12b1 calculates income obtained in one year.

The prediction traffic calculation part 12b2 calculates the prediction income obtained according to the prediction traffic load shown in the prediction traffic data based on inputs of the prediction traffic data that stored in the traffic data storage section 12c, and outputs the calculation result to the income and expenditure calculation section 14. For instance, the prediction traffic calculation part 12b2 calculates the prediction income obtained in one year.

The wireless parameter change cost calculation section 13a calculates various costs necessary to change the wireless parameter based on inputs of the data of the changed wireless parameter outputted from the wireless parameter change section 11b, and outputs the calculation result to the income and expenditure calculation section 14.

In the change of the wireless parameter, for instance, if changing the transmission electric power, an additional personnel cost may be occurred, or occasionally, a considerable cost for setting a new transmission amplifier may be needed according to the change of the parameter. For instance, the wireless parameter change cost calculation section 13a has a memory in which the cost due to the change of the parameter is stored being related with contents of the parameter change. The wireless parameter change cost calculation section 13a calculates the various costs needed to change the wireless parameter by using this memory. The wireless parameter change cost calculation section 13a calculates an annual expense based on those total cost and a prediction use period.

The wireless base station extension cost calculation section 13b calculates a cost necessary to extend the wireless base station to the point based on inputs of the data of the extension point for the wireless base station, and outputs the calculation result to the income and expenditure calculation section 14.

Due to the extension of the wireless base station, for example, a cost for the wireless base station itself, a use fee for a building roof top to set the base station, a cost for a maintenance, and the like should be occurred. For instance, the wireless base station extension cost calculation section 13b has a memory in which an extension point for the wireless base station is stored being related to the cost needed to extend the wireless base station in the point. The wireless base station extension cost calculation section 13b calculates the costs needed to extend the wireless base station in the extension point for the wireless base station by using this memory. The wireless base station extension cost calculation section 13b calculates an annual expense based on those total cost and the prediction use period.

The income and expenditure calculation section 14 subtracts the present traffic income from the prediction traffic income in order to obtain an increased income due to an increase of accommodation traffic. Further, the income and expenditure calculation section 14 adds the expense of the costs for extension of the wireless base station and the expense of the costs to change the wireless parameter in order to obtain an increased expense due to the extension of the wireless base station and the change of the wireless parameter. Continuously, the income and expenditure calculation section 14 adds the increases expense due to the extension of the wireless base station and the change of the wireless parameter, and a former-occurred expense in order to obtain an expense after the extension of the wireless base station and the change of the wireless parameter. Here, the former-occurred expense is stored in the income and expenditure calculation section 14. Furthermore, the income and expenditure calculation section 14 subtracts the obtained expense from the mentioned income in order to obtain a profit, and divides the profit by the expense to obtain a profit margin. The income and expenditure calculation section 14, then, outputs the profit margin, the profit, the income, the increased income, the expense, the increased expense, the extension point for the wireless base station, and the changed wireless parameter collectively to an external section (the display panel 16 in the embodiment).

Next, an operation of a wireless network optimization support system as an embodiment of the wireless network change support system of the present invention will be described below.

Figure 6:
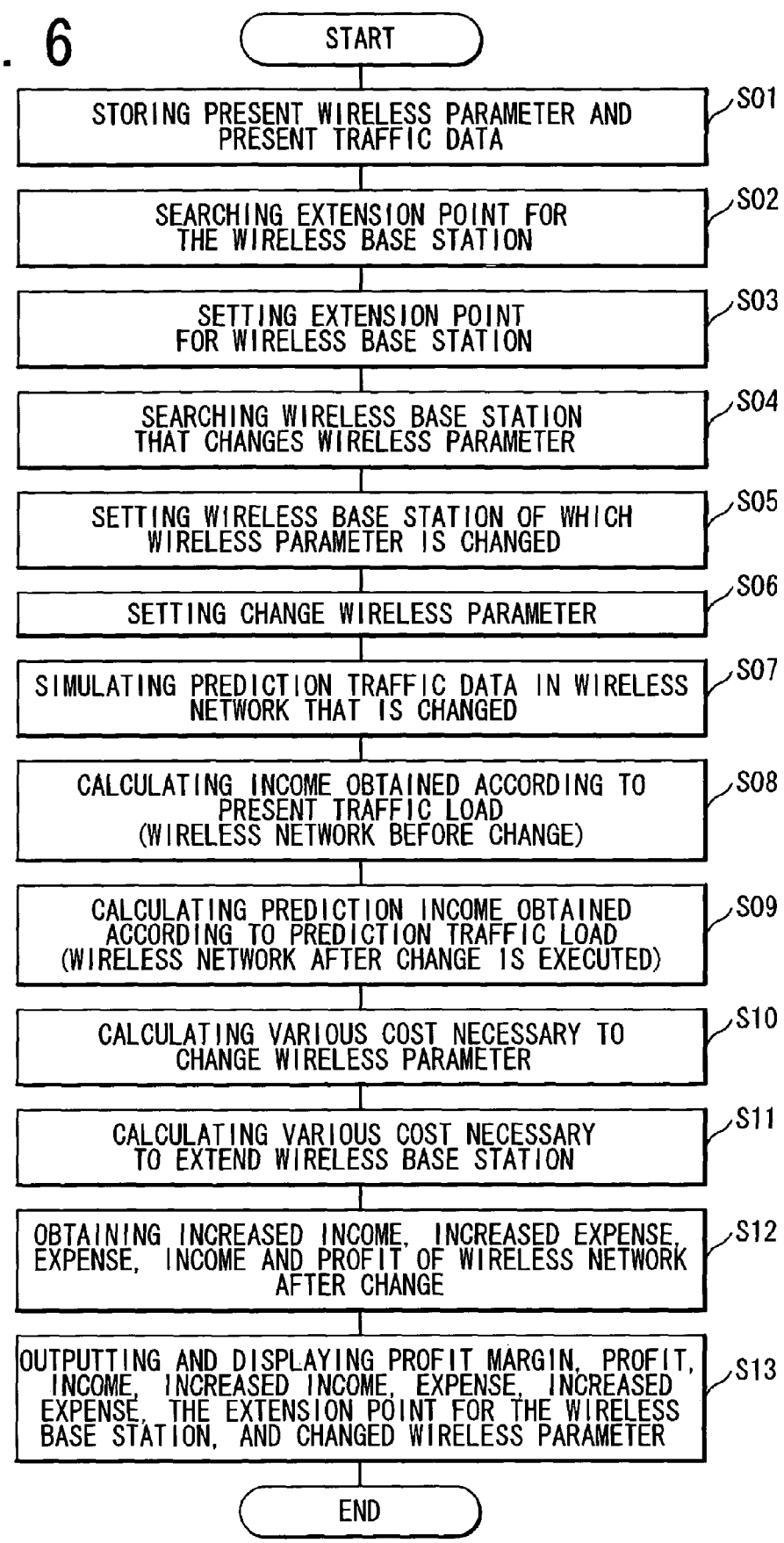
FIG. 6 is a flowchart showing the operation of the embodiment of the wireless network change support system of the present invention.

FIG. 6 is a flowchart to explain the operation (a method to support the wireless network change) of the wireless network optimization support system as the embodiment of the wireless network change support system of the present invention.

The wireless parameter storage section 15 stores the wireless parameter 31 before the change in the wireless network from the wireless network management section 4. The traffic data storage section 12c stores the traffic data 32 before the change in the wireless network from the wireless network management section 4 (a step S01).

Continuously, the extension point search section 11a1 searches the extension point for the wireless base station based on the present wireless parameter and the present traffic data (a step S02).

Figure 7:
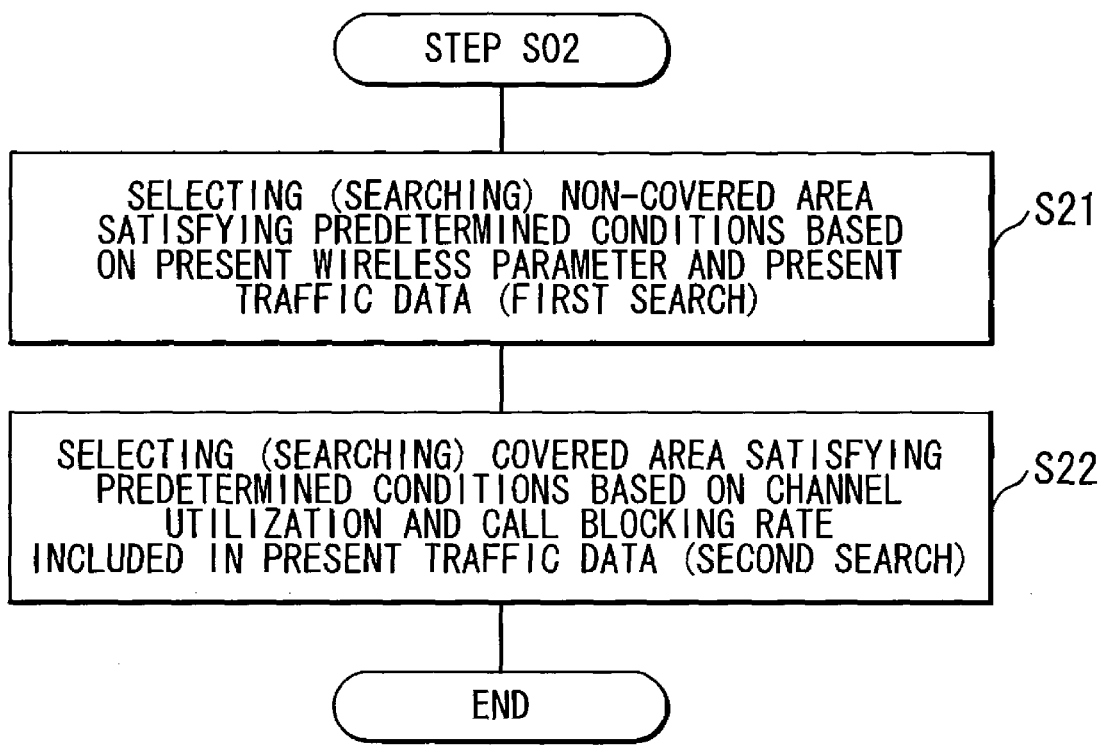
FIG. 7 is a flow chart showing the details of the step S02.

Here, details of the step S02 are explained referring to FIG. 7. FIG. 7 is a flow chart showing the details of the step S02.

The extension point search section 11a1 selects (searches) an area not covered by any base station (a non-covered area in the wireless network) based on the present wireless parameter in the wireless network stored in the wireless parameter storage section 15 and the present traffic data stored in the traffic data storage section 12c. Then, the extension point search section 11a1 selects (searches) an area occupying a large area and surrounded by each wireless base station having the large traffic load of the sector (the first search: a step S21).

The extension point search section 11a1 selects (searches) a covered area having the large traffic load as much as that each sector cannot accommodate among the sectors of each wireless base station based on the channel utilization and a call blocking rate included in the present traffic data stored in the traffic data storage section 12c (the second search: a step S22).

The extension point search section 11a1 may execute any one of the above-mentioned first search and the second search.

Figure 8:
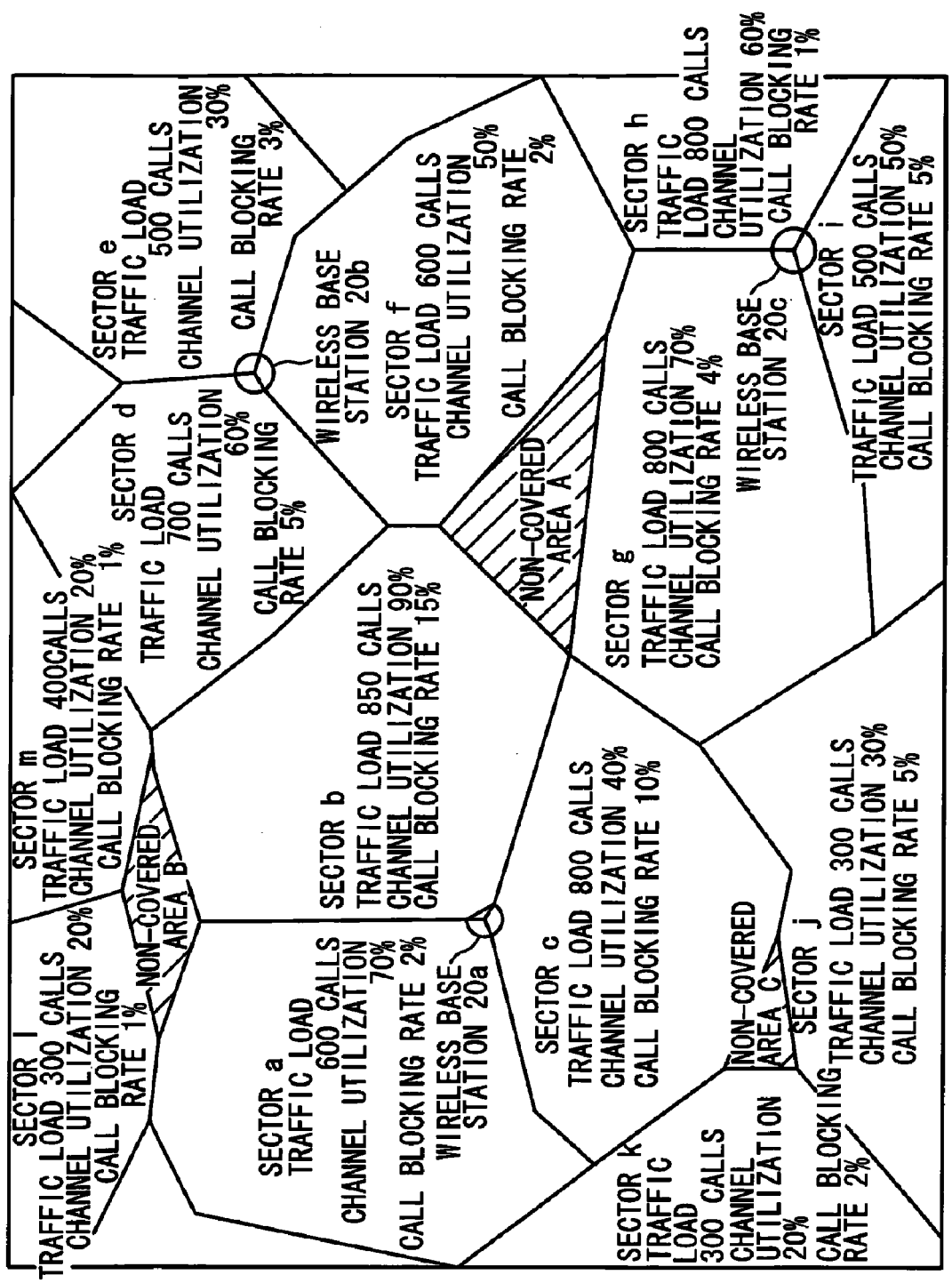
FIG. 8 is a diagram showing the search executed by the extension point search section.

FIG. 8 is a diagram to explain the mentioned first search and the second search executed by the extension point search section 11a1. Concretely, it is an example of the cellular system that shows the traffic data.

Each of a wireless base station 20a, a wireless base station 20b, and a wireless base station 20c has each of covered areas including three sectors as shown in FIG. 8. Concretely, the base station 20a has the covered area including a sector a, a sector b, and a sector c. Moreover, the base station 20b has the covered area including a sector d, a sector e, and a sector f. Furthermore, the base station 20c has the covered area including a sector g, a sector h, and a sector i. Slashed areas in FIG. 8 (a non-covered area A, a non-covered area B, and a non-covered area C) indicates the areas (non-covered areas) of the wireless system where the reception level from all sectors is equal to or less than a predetermined value in the area.

Next, referring to FIG. 8, the mentioned first search and second search by the extension point search section 11a1 are explained.

At the first search processing, the extension point search section 11a1 selects the non-covered area A, because the area is the widest in the non-covered areas A to C, and all of the surrounding sectors of the wireless base station have the large traffic load (the step S21). The judgment of "the traffic load is large" executed by a processing of judgment showing that the traffic load is larger than a predetermined value. For instance, the judgment is done when the traffic load is 600 calls or more.

At the second search processing, the extension point search section 11a1 selects the covered area of the sector b, because the sector b has the large traffic load to be accommodated in sectors of each wireless base station (the step S22). The judgment of "the traffic load that cannot be accommodated is large" is executed by a processing of the judgment showing that the traffic load that cannot be accommodated is larger than a predetermined value. For instance, the judgment is done by the processing of the judgment that the channel utilization is larger than the predetermined value (for instance, 80%) in the viewpoint with high probability that the traffic cannot be accommodated by the exceeding of the 100% of the channel utilization. Moreover, the judgment is done by the processing of the judgment that the call blocking rate is equal to or larger than a predetermined value (for instance, 15%) in the viewpoint of the large traffic load is large that cannot be accommodated due to the call loss.

Referring to FIG. 6 the extension point search section 11a1 sets a point included in a predetermined area in the selected area as an extension point for the wireless base station, that is, the change data, in the base station extension section 11a. The point (the predetermined point) may be decided by the judgment of a person or the base station extension section 11a (a step S03).

An example of the method that the base station extension section 11a decides the predetermined point among the areas selected by the extension point search section 11a1 is described below. If a circumcenter of a triangle of the three wireless base stations located in the nearest position from the selected area as tops (the circumcenter is the point having the equal distance to the three tops) is included in the selected area, the mentioned circumcenter is set as the predetermined point. If it is not so, a point that is located in the nearest to the mentioned circumcenter is set as the predetermined point.

Next, the change target search section 11b1 searches the wireless base station that changes the wireless parameter based on the present wireless parameter and the present traffic data (a step S04).

Figure 9:
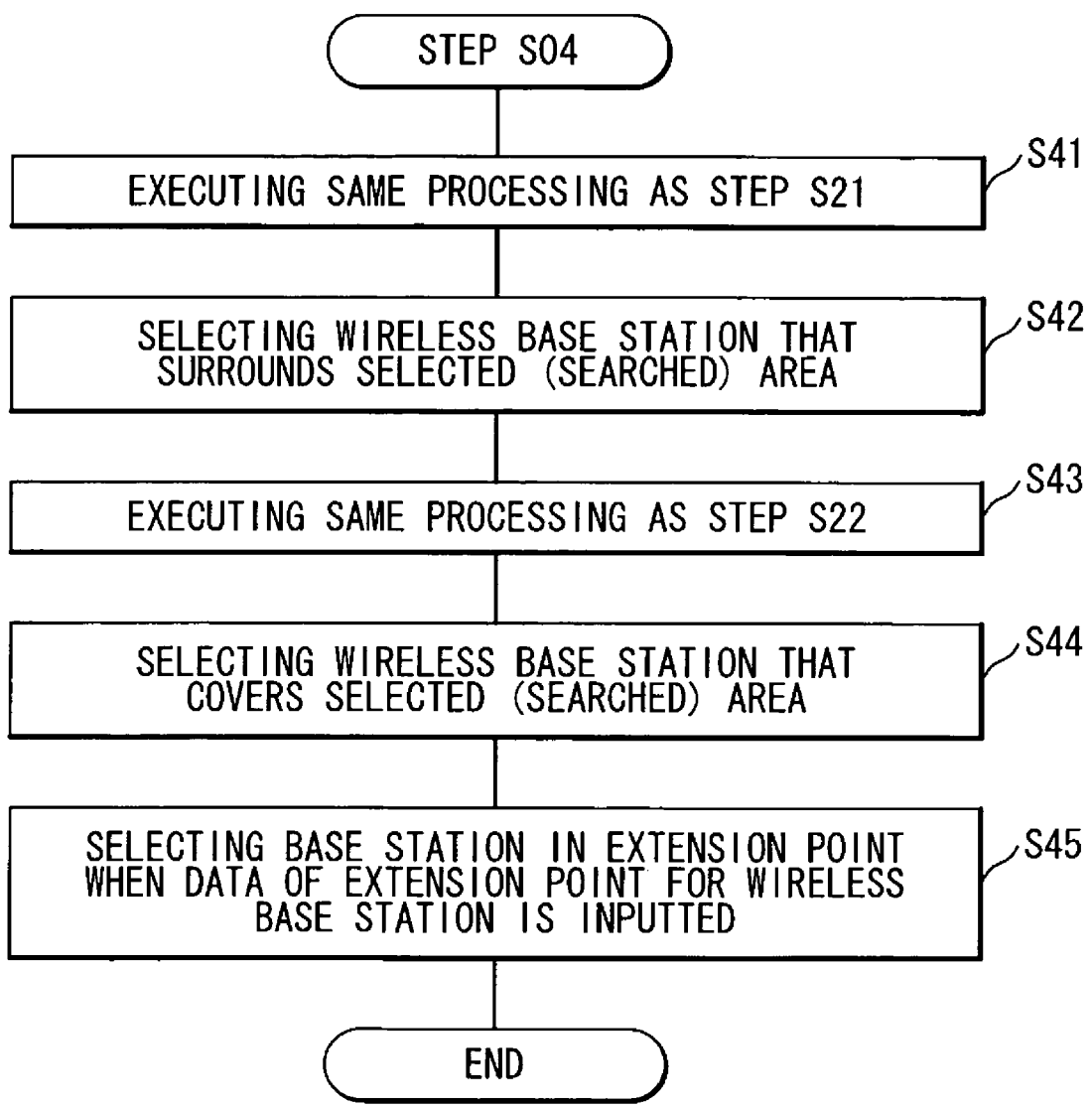
FIG. 9 is a flow chart showing the details of the step S04.

Here, details of the step S04 are explained referring to FIG. 9. FIG. 9 is a flow chart showing the details of the step S04.

First, the change target search section 11b1 executes the same processing as the first processing (the step S21), which the extension point search section 11a1 executes (a step S41). The wireless base station that surrounds the area searched and selected in the first processing is selected (a step S42). That is, the change target search section 11b1 selects the sector of the wireless base station located in the surroundings of the area searched and selected.

Second, the change target search section 11b1 executes the same processing as the second processing (the step S22), which is executed by the extension point search section 11a1 (a step S43). The wireless base station that covers the area searched and selected in the second processing is selected (a step S44). Concretely, the change target search section 11b1 selects the sector of the wireless base station surrounding the searched and selected area.

Third, when the data of the extension point for the wireless base station (the step S03) is inputted from the base station extension section 11a, the base station in the extension point is selected (a step S45). Concretely, the change target search section 11b1 selects all sectors of the base station in the extension point.

An operation of the change target search section 11b1 will be explained with reference to FIG. 8. The area, which is selected according to the same processing as the first processing by the extension point search section 11a1, is the non-covered area A (the step S41). Therefore, the change target search section 11b1 firstly selects the sectors b, c, f and g surrounding the non-covered area A (the step S42).

The sector secondary selected by the change target search section 11b1 is the sector b that is selected according to the same processing as the second processing executed by the extension point search section 11a1. The sectors thirdly selected by the change target search section 11b1 is all the sectors having the wireless base station in the inputted extension point if the data of the extension point for the wireless base station is inputted from the base station extension section 11a.

Referring to FIG. 6, the change target search section 11b1 set any one of the wireless base stations (concretely, the sector of the wireless base station), which are selected at the above-mentioned first selection (the step S42), the second selection (the step S44), and the third selection (step S45), as a wireless parameter change target base station (concretely, a sector of the wireless parameter change target base station). That is, the change target search section 11b1 sets any one of the selected sectors of the wireless base stations in the wireless parameter change section 11b as the wireless parameter change target base station, namely, the change data (a step S05). Which sector of the wireless base station among the selected sectors of the wireless base stations is set as the wireless parameter change target may be decided depending on the judgment of a person or the wireless parameter change section 11b.

Figure 10:
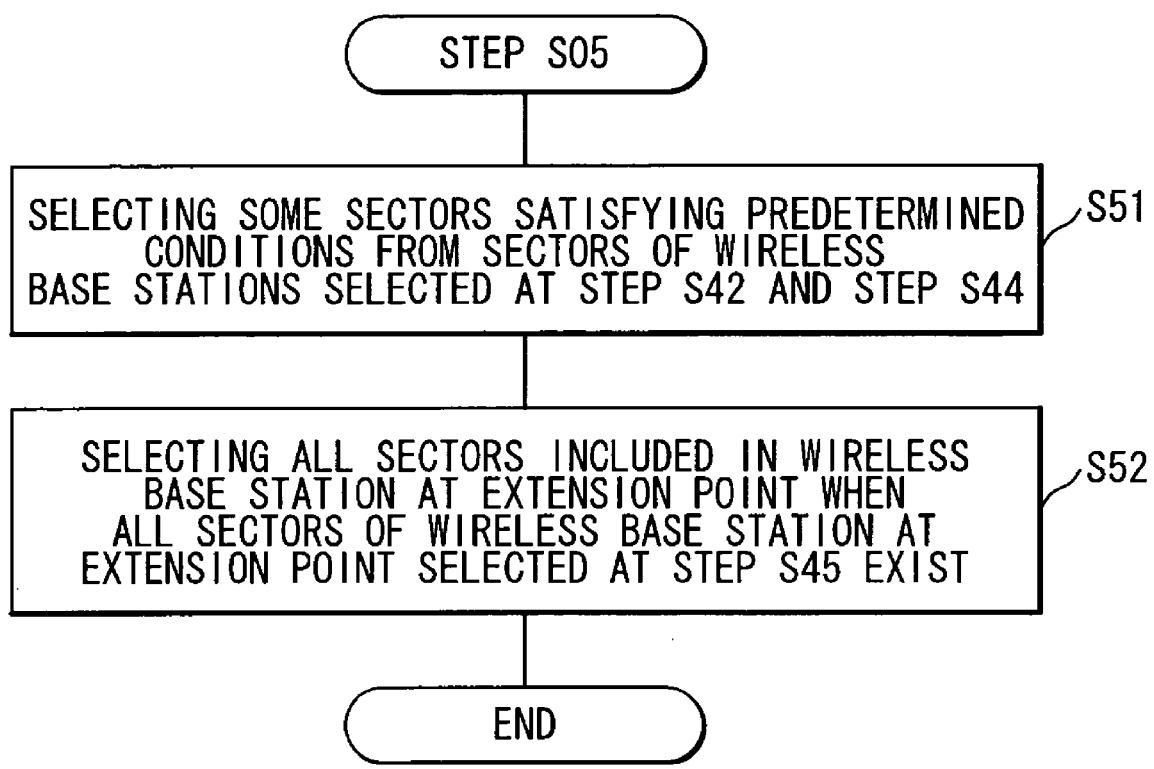
FIG. 10 is a flow chart showing the details of the step S05.

An example of a method that the wireless parameter change section 11b decides the wireless parameter change target base station among the sectors of the wireless base stations searched by the change target search section 11b1 will be described bellow. FIG. 10 is a flow chart showing details of the step S05.

First, according to viewpoint that the deterioration rate is acceptable, some sectors of the wireless base station, which have high order of ascending order in the deterioration rates, are selected among the sectors of the wireless base stations selected by the change target search section 11b1 at the first selection (the step S42) and the second selection (the step S44) (a step S51). Otherwise, according to a viewpoint that the traffic load to be accommodated is acceptable, some sectors of the wireless base station, which have high order of ascending order in the channel utilization, may be selected among them (a step S51). Next, all sectors included in the wireless base station at the extension point are selected (a step S52), when all sectors of the wireless base station at the extension point exist, which are selected by the change target search section 11b1 in the third selection (the step S45). The sectors selected like this are set as the wireless parameter change target.

The wireless parameter change section 11b set a change data that is changed to be a predetermined value as a wireless parameter in the wireless base station as an object. The predetermined value may be decided by a person or may be decided by the wireless parameter change section 11b (a step S06).

Here, when the wireless parameter change section 11b decides the predetermined value, the wireless parameter change section 11b changes the wireless parameter of the wireless base station to be the predetermined value based on inputs of the present wireless parameter stored in the wireless parameter storage section 15, the present traffic data stored in the traffic data storage section 12c, and the data of the extension point of the wireless base station outputted from the base station extension section 11a, and outputs the data of the changed wireless parameter as a change data.

An example of a concrete method for deciding the redetermined value will be explained as follows. A transmission electric power as the wireless parameter of the sector having less channel utilization (for instance, 50% or less) of the present traffic data is set as the larger value than the present transmission electric power for an constant volume (for instance, 1 dB), so that the traffic that can be accommodated may be more increased than the current state by expanding the covered area of the wireless parameter change target base station. Otherwise, the tilt angle of the antenna as the wireless parameter is set to be smaller value than the present angle for a constant angle (for instance, one degree) in the depression direction. In addition, when the data of the extension point is inputted, the tilt angle of the antenna shown in the wireless parameter of the sector of the wireless base station at the extension point and each value of the transmission electric power are set to the average value of the wireless parameter of the sector of the surrounding wireless base station.

Next, a simulator 12a calculates a prediction traffic data configured by a prediction traffic load, a prediction channel utilization, and a prediction call blocking rate, in the wireless network that is changed according to the change data (a step S07).

A present traffic income calculation section 12b1 calculates an income obtained according to the present traffic load shown in the present traffic data based on an input of the present traffic data. For instance, the present traffic income calculation section 12b1 calculates an income obtained in one year (a step S08).

A prediction traffic calculation part 12b2 calculates the prediction income obtained according to the prediction traffic load shown in the prediction traffic data based on an input of the prediction traffic data. For instance, the prediction traffic calculation part 12b2 calculates the prediction income obtained in one year (a step S09).

A wireless parameter change cost calculation section 13a calculates various cost necessary to change the wireless parameter based on the input of the data of the changed wireless parameter outputted by the wireless parameter change section 11b. For instance, the wireless parameter change cost calculation section 13a calculates an expense a year necessary to change the wireless parameter (a step S10).

The wireless base station extension cost calculation section 13b calculates a necessary cost to extend the wireless base station to the extension point based on the input of the data of the extension point for the wireless base station. For instance, the wireless base station extension cost calculation section 13b calculates an expense a year necessary to extend the wireless base station (a step S11).

An income and expenditure calculation section 14 obtains an "increased income" by subtracting the present traffic income and the prediction traffic income. Moreover, the income and expenditure calculation section 14 obtains an "increase expense", which is occurred due to the extension of the wireless parameter or the change of the wireless parameter, by adding the expense of an increased cost for the wireless base station and an expense of the change cost of the wireless parameter.

Then, the income and expenditure calculation section 14 obtains an "expense" after the extension of the wireless parameter or the change of the wireless parameter, by adding the increased expense due to the extension of the wireless base station and the change of the wireless parameter to an expense that has been occurred up to the present time. The expense that has been occurred up to the present time is stored in the income and expenditure calculation section 14.

Furthermore, the income and expenditure calculation section 14 subtracts the obtained "expense" from the mentioned "income" in order to obtain a "profit", and divides the profit by the expense to obtain a "profit margin" (a step S12).

The income and expenditure calculation section 14, then, outputs the profit margin, the profit, the income, the increased income, the expense, the increased expense, the extension point for the wireless base station, and the changed wireless parameter collectively to a display panel 16. The display panel 16 displays them based on the output of the income and expenditure calculation section 14 (a step S13).

Continuously, the operation shown in FIG. 6 is repeated changing the change data.

FIG. 11 is an example of a display of the display panel 16. It should be noted that the display of the display panel 16 is not limited to the one shown in FIG. 11.

As shown in FIG. 11, how the profit margin increases by executing the extension of the wireless base station and the change of the wireless parameter is displayed.

The example shown in FIG. 11, the case that the profit margin is the maximum is displayed as an OPTIMAL. The profit, the income, the increased income, expense, and the increase expense are sequentially displayed in a right column where the profit margin is displayed. Moreover, the data of the extension point for the wireless base station and the changed wireless parameter are displayed in the column in the right edge as a file.

Moreover, the wireless network optimization support system 1 may be configured so as to include a memory as a recording medium read by a computer, and a CPU as the computer. In this case, in the memory, which configures the wireless network optimization support system 1, the program for the CPU is stored, which executes the above-mentioned method for supporting a wireless network change that is to be executed by the wireless network optimization support system 1. The CPU, which configures the wireless network optimization support system 1, reads the program stored in the memory, then executes the method for supporting a wireless network change based on the program read.

Moreover, the program recorded in the memory that configures the wireless network optimization support system 1, may be recorded in a recording medium such as anoptical disk and the like, which can be read by a computer. In this case, the program recorded in the recording medium such as optical disks is read with a reading apparatus, and records the read program in the memory configuring the wireless network optimization support system 1. Then, the CPU configuring the wireless network optimization support system 1 can execute the above-mentioned method to support wireless network change.

In the embodiment of the present invention, the extension point for the wireless base station and the change of the wireless parameter of the wireless base station are set, then, the profit margin, the profit, the income, and the income and expenditure are outputted, which can be obtained by the mentioned setting and contents of the setting.

Obtaining the output from the income and expenditure calculation section corresponding to a plurality of the change data, it is possible to obtain the data of the extension point for the base station to maximize the profit margin and the change of the wireless parameter of the wireless base station.

In the embodiment of the present invention, searching the place where any sector of the wireless base station does not cover (the non-covered area) is wide, and the place having the large traffic load in the sectors of each wireless base station surrounding the non-covered area, a target to be the extension point for the wireless base station and the wireless parameter change base station can be obtained.

In this processing, the non-covered area that is predicted to have the large traffic load is searched by searching the place with the large traffic load in the sectors of each wireless base station surrounding the non-covered area.

Extending the wireless base stations in such place, or changing the wireless parameter of the base station, it is possible to get the non-covered area predicted to have the large traffic load to be a covered area by set the place to be a covered area. As a result, the larger traffic load can be accommodated, and the profit margin can be increased.

Moreover, in the embodiment of the present invention, the target of the extension point for the wireless base station and the wireless parameter change target base station can be obtained by searching the place predicted to have the large traffic load that cannot be accommodated (the sector of the wireless base station) based on the traffic load in the sector of each wireless base station, the channel utilization, the traffic data of call blocking rate and the like (that is, in the case that the channel utilization is larger than the predetermined value or the call blocking rate is larger than the predetermined value).

That is to say, it is possible to accommodate the traffic that is not expected to accommodate by extending the wireless base station to the place that is predicted to have the large traffic load that is not accommodate, or changing the wireless parameter of the wireless base station that is in the place predicted to have the large traffic load that is not accommodated. As a result, larger traffic can be accommodated and the profit margin can be increased.

In the embodiment of the present invention, the order to execute the first processing and the second processing by the extension point search section 11a1 may be changed flexibly at the searching the extension point of the wireless base station. Moreover, when searching the extension point for the wireless base station, the extension point search section 11a1 may execute either the first or second processing.

Moreover, in the embodiment of the present invention, the order to execute the first, second and third processing by the change target search section 11b1 may be changed flexibly at the searching the wireless base station which wireless parameter is to be changed. Moreover, the change target search section 11b1 may execute any one of the first, second, and third processing when searching the wireless base station which wireless parameter is to be changed.

In the embodiment of the present invention as explained up to this, the configuration shown in Figs is just an example, and the present invention is not limited to the configuration.

According to the present invention, it is possible to calculate the profit and the profit margin of the wireless service providers when the wireless network is changed according to the change data, and thus, it is possible to obtain the change data of the wireless network data to increase the profit margin. As a result, the change data of the wireless network that can increase the profit margin can be proposed.

Moreover, it is possible to propose the "extension point for the base station" or the "change of the wireless parameter in the wireless base station" which increases the profit margin by using the extension point for the wireless base station or the wireless parameter of the wireless base station as the change data.

The invention claimed is:

1. A wireless network change support system comprising:
a first storage section which stores setting data indicating a setting of a wireless network with wireless base stations, wherein said setting data includes a covered area data indicating a covered area of a sector of each of said wireless base stations included in said wireless network;
a second storage section which stores status data indicating a status of said wireless network, wherein said status data includes a traffic data indicating a status of a traffic of said sector of each of said wireless base stations included in said wireless network;
a change setting section which searches a non-covered area, which is not covered by said wireless base stations and is adjacent to said sector having a larger amount of said traffic than a predetermined value, based on said status data and said setting data, and sets a change data, which includes a wireless parameter change data indicating a change of a wireless parameter of a wireless base station, for changing said non-covered area to said covered area;
an income prediction section which calculates a prediction income in said wireless network based on said status data, said setting data and said change data when said setting data is changed, according to said change data; and
an expense calculation section comprising a processor, which calculates a prediction expense, which is necessary to execute a change of said wireless network as indicated in said change data based on said change data.

2. The wireless network change support system according to claim 1, further comprising:
an income and expenditure calculation section which calculates a profit of said wireless network when said setting data is changed on the basis of said changing data, based on said prediction income and said prediction expense.

3. The wireless network change support system according to claim 1, wherein said income prediction section includes:
a traffic prediction section which calculates a prediction traffic data indicating a predict traffic load in said wireless network when said setting data is changed on the basis of said changing data, based on said status data, said setting data and said change data, and
an income calculation section which calculates said prediction income based on said prediction traffic data.

4. The wireless network change support system according to claim 1, wherein said change setting section includes:
a base station extension section which sets an extension position data indicating a extension position for a wireless base station extended in said wireless network based on said status data and said setting data,
wherein said change data includes said extension position data.

5. The wireless network change support system according to claim 4, further comprising:
wherein said setting data includes a covered area data indicating a covered area of a sector of each of said wireless base stations included in said wireless network before said wireless base station is extended,
wherein said status data includes a traffic data indicating a status of a traffic of a sector of each of said wireless base stations included in said wireless network before said wireless base station is extended,
wherein said base station extension section includes: an extension point search section which searches said extension position based on said covered area data stored in said first storage section and said traffic data stored in said second storage section, and
sets said extension position data based on a searching result of said extension point search section.

6. The wireless network change support system according to claim 5, wherein said extension point search section searches at least one of an area occupying a large area and surrounded by sectors having a large traffic load from areas except for said covered area and a sector having a large traffic load which cannot be accommodated among sectors of each of said wireless base stations, as said extension position.

7. The wireless network change support system according to claim 4, wherein said setting data includes a wireless parameter indicating communication properties of said wireless network, wherein said change setting section includes:
a wireless parameter change section which sets a wireless parameter change data indicating a change of said wireless parameter based on said status data and said setting data, and
wherein said change data includes said wireless parameter change data.

8. The wireless network change support system according to claim 1, wherein said setting data includes a wireless parameter indicating communication properties of said wireless network, and
wherein said change setting section includes:
a wireless parameter change section which sets a wireless parameter change data indicating a change of said wireless parameter based on said status data and said setting data.

9. The wireless network change support system according to claim 7, further comprising:
wherein said setting data includes a covered area data indicating a covered area of a sector of each of said wireless base stations included in said wireless network before said wireless parameter is changed,
wherein said status data includes a traffic data indicating a status of a traffic of a sector of each of said wireless base stations included in said wireless network before said wireless parameter is changed, wherein said wireless parameter change section includes:
an change target search section which searches a wireless base station of which said wireless parameter to be changed based on said covered area data stored in said first storage section and said traffic data stored in said second storage section, and sets a wireless base station of which said wireless parameter to be changed based on a searching result of said change target search section.

10. The wireless network change support system according to claim 7, further comprising:
wherein said setting data includes a covered area data indicating a covered area of a sector of each of said wireless base stations included in said wireless network before said wireless parameter is changed, wherein said status data includes a traffic data indicating a status of a traffic of a sector of each of said wireless base stations included in said wireless network before said wireless parameter is changed, wherein said wireless parameter change section includes:
an change target search section which searches a wireless base station of which said wireless parameter to be changed based on said covered area data stored in said first storage section and said traffic data stored in said second storage section, and sets a wireless base station of which said wireless parameter to be changed based on a searching result of said change target search section, wherein said change target search section searches at least one of a wireless base station which is placed around an area occupying a large area and surrounded by sectors having a large traffic load from areas except for said covered area, a wireless base station which has a sector having a large traffic load which cannot be accommodated among sectors of each of said wireless base stations, and a wireless base station which is placed at an extension position indicated in said extension position data, as said wireless base station of which said wireless parameter to be changed.

11. A method for supporting wireless network change, which executes a change of a wireless network with wireless base stations by using wireless a network change support system, said method comprising:
(a') searching a non-covered area, which is not covered by said wireless base stations and is adjacent to a sector having a larger amount of a traffic than a predetermined value, based on a status data and a setting data by a change setting section of said network change support systems, said setting data including a covered area data indicating a covered area of a sector of each of said wireless base stations included in said wireless network, said status data including a traffic data indicating a status of a traffic of a sector of each of said wireless base stations included in said wireless network;

(a) setting a change data, which includes a wireless parameter change data including a change of a wireless parameter of a wireless base station, for changing said non-covered area to said covered area, by said change setting section of said network change support system;

(b) calculating a prediction income in said wireless network based on said status data, said setting data and said change data when said setting data is changed according to said change data, by an income prediction section of said network change support system; and (c) calculating a prediction expense, which is necessary to execute a change of said wireless network as indicated in said change data based on said change data by an expense calculation section of said network change support system.

12. The method for supporting wireless network change according to claim 11, further comprising:
(d) calculating a profit of said wireless network when said setting data is changed on the basis of said changing data, based on said prediction income and said prediction expense by an income and expenditure calculation section of said network change support system.

13. The method for supporting wireless network change according to claim 11, wherein said step (b) includes:
(b1) calculating a prediction traffic data indicating a predict traffic load in said wireless network when said setting data is changed on the basis of said changing data, based on said status data, said setting data and said change data by said income prediction section, and (b2) calculating said prediction income based on said prediction traffic data by said income prediction section.

14. The method for supporting wireless network change according to claim 11, wherein said step (a) includes:
(a1) setting an extension position data indicating a extension position for a wireless base station extended in said wireless network based on said status data and said setting data by said change setting section, wherein said change data includes said extension position data.

15. The method for supporting wireless network change according to claim 14, wherein said step (a1) includes:
(a11) searching said extension position based on said setting data and said status data by said change setting section, and (a12) setting said extension position data based on said searching result by said change setting section, wherein said setting data includes a covered area data indicating a covered area of a sector of each of said wireless base stations included in said wireless network before said wireless base station is extended, wherein said status data includes a traffic data indicating a status of a traffic of a sector of each of said wireless base stations included in said wireless network before said wireless base station is extended.

16. The method for supporting wireless network change according to claim 15, wherein said step (a11) includes:
(a111) searching at least one of an area occupying a large area and surrounded by sectors having a large traffic load from areas except for said covered area and a sector having a large traffic load which cannot be accommodated among sectors of each of said wireless base stations, as said extension position by said change setting section.

17. The method for supporting wireless network change according to claim 14, wherein said setting data includes a wireless parameter indicating communication properties of said wireless network, wherein said step (a) further includes:
(a2) setting a wireless parameter change data indicating a change of said wireless parameter based on said status data and said setting data by change setting section, and wherein said change data includes said wireless parameter change data.

18. The method for supporting wireless network change according to claim 11, wherein said setting data includes a wireless parameter indicating communication properties of said wireless network, wherein said step (a) includes:
(a2) setting a wireless parameter change data indicating a change of said wireless parameter based on said status data and said setting data by said change setting section, and
wherein said change data includes said wireless parameter change data.

19. The method for supporting wireless network change according to claim 17, wherein said step (a2) includes:
(a21) searching a wireless base station of which said wireless parameter to be changed based on said setting data and said status data by said change setting section, and
(a22) setting a wireless base station of which said wireless parameter to be changed based on a searching result of said change setting section by said change setting section,
wherein said setting data includes a covered area data indicating a covered area of a sector of each of said wireless base stations included in said wireless network before said wireless parameter is changed, and
wherein said status data includes a traffic data indicating a status of a traffic of a sector of each of said wireless base stations included in said wireless network before said wireless parameter is changed.

20. The method for supporting wireless network change according to claim 17, wherein said step (a2) includes:
(a21) searching a wireless base station of which said wireless parameter to be changed based on said setting data and said status data by said change setting section, and
(a22) setting a wireless base station of which said wireless parameter to be changed based on a searching result of said change setting section by said change setting section,
wherein said setting data includes a covered area data indicating a covered area of a sector of each of said wireless base stations included in said wireless network before said wireless parameter is changed,
wherein said status data includes a traffic data indicating a status of a traffic of a sector of each of said wireless base stations included in said wireless network before said wireless parameter is changed, and
wherein said step (a21) includes:
(a211) searching at least one of a wireless base station which is placed around an area occupying a large area and surrounded by sectors having a large traffic load from areas except for said covered area, a wireless base station which has a sector having a large traffic load which cannot be accommodated among sectors of each of said wireless base stations, and a wireless base station which is placed at an extension position indicated in said extension position data, as said wireless base station of which said wireless parameter to be changed by said change setting section.

21. A non-transitory computer readable medium storing instructions readable by a computer for performing a method for supporting wireless network change which executes a change of a wireless network with wireless base stations by using wireless a network change support system, said method comprising:
(a') searching a non-covered area, which is not covered by said wireless base stations and is adjacent to a sector having a larger amount of a traffic than a predetermined value, based on a status data and a setting data by a change setting section of said network change support system,
said setting data including a covered area data indicating a covered area of a sector of each of said wireless base stations included in said wireless network,
said status data including a traffic data indicating a status of a traffic of a sector of each of said wireless base stations included in said wireless network;
(a) setting a change data, which includes a wireless parameter change data indicating a change of a wireless parameter of a wireless base station, for changing said non-covered area to said covered area, by said change setting section;
(b) calculating a prediction income in said wireless network based on said status data, said setting data and said change data when said setting data is changed, according to said change data, by an income prediction section of said network change support system; and
(c) calculating a prediction expense, which is necessary to execute a change of said wireless network as indicated in said change data based on said change data by an expense calculation section of said network change support system.

22. The computer readable medium according to claim 21, further comprising:
(d) calculating a profit of said wireless network when said setting data is changed on the basis of said changing data, based on said prediction income and said prediction expense by an income and expenditure calculation section of said network change support system.

23. The computer readable medium according to claim 21, wherein said step (b) includes:
(b1) calculating a prediction traffic data indicating a predict traffic load in said wireless network when said setting data is changed on the basis of said changing data, based on said status data, said setting data and said change data by said income prediction section, and
(b2) calculating said prediction income based on said prediction traffic data by said income prediction section.

24. The computer readable medium according to claim 21, wherein said step (a) includes:
(a1) setting an extension position data indicating a extension position for a wireless base station extended in said wireless network based on said status data and said setting data by said change setting section,
wherein said change data includes said extension position data.

25. The computer readable medium according to claim 24, wherein said step (a1) includes:
(a11) searching said extension position based on said setting data and said status data by said change setting section, and
(a12) setting said extension position data based on said searching result by said change setting section,
wherein said setting data includes a covered area data indicating a covered area of a sector of each of said wireless base stations included in said wireless network before said wireless base station is extended,
wherein said status data includes a traffic data indicating a status of a traffic of a sector of each of said wireless base stations included in said wireless network before said wireless base station is extended.

26. The computer readable medium according to claim 25, wherein said step (a11) includes:
(a111) searching at least one of an area occupying a large area and surrounded by sectors having a large traffic load from areas except for said covered area and a sector having a large traffic load which cannot be accommodated among sectors of each of said wireless base stations, as said extension position by said change setting section.

27. The computer readable medium according to claim 24, wherein said setting data includes a wireless parameter indicating communication properties of said wireless network,
wherein said step (a) further includes:
(a2) setting a wireless parameter change data indicating a change of said wireless parameter based on said status data and said setting data by change setting section, and
wherein said change data includes said wireless parameter change data.

28. The computer readable medium according to claim 21, wherein said setting data includes a wireless parameter indicating communication properties of said wireless network,
wherein said step (a) includes:
(a2) setting a wireless parameter change data indicating a change of said wireless parameter based on said status data and said setting data by said change setting section, and
wherein said change data includes said wireless parameter change data.

29. The computer readable medium according to claim 27, wherein said step (a2) includes:
(a21) searching a wireless base station of which said wireless parameter to be changed based on said setting data and said status data by said change setting section, and
(a22) setting a wireless base station of which said wireless parameter to be changed based on a searching result by said change setting section,
wherein said setting data includes a covered area data indicating a covered area of a sector of each of said wireless base stations included in said wireless network before said wireless parameter is changed, and
wherein said status data includes a traffic data indicating a status of a traffic of a sector of each of said wireless base stations included in said wireless network before said wireless parameter is changed.

30. The computer readable medium according to claim 27, wherein said step (a2) includes:
(a21) searching a wireless base station of which said wireless parameter to be changed based on said setting data and said status data by said change setting section, and
(a22) setting a wireless base station of which said wireless parameter to be changed based on a searching result by said change setting section,
wherein said setting data includes a covered area data indicating a covered area of a sector of each of said wireless base stations included in said wireless network before said wireless parameter is changed,
wherein said status data includes a traffic data indicating a status of a traffic of a sector of each of said wireless base stations included in said wireless network before said wireless parameter is changed, and
wherein said step (a21) includes:
(a211) searching at least one of a wireless base station which is placed around an area occupying a large area and surrounded by sectors having a large traffic load from areas except for said covered area, a wireless base station which has a sector having a large traffic load which cannot be accommodated among sectors of each of said wireless base stations, and a wireless base station which is placed at an extension position indicated in said extension position data, as said wireless base station of which said wireless parameter to be changed by said change setting section.

* * * * *